United States Patent
Chin et al.

(10) Patent No.: US 8,111,657 B2
(45) Date of Patent: Feb. 7, 2012

(54) OPTIMISING COMMUNICATION LINKS

(75) Inventors: Choong M Chin, Kuala Lumpur (MY); Sverrir Olafsson, Ipswich (GB); Moh L Sim, Selangor (MY)

(73) Assignee: British Telecommunications public limited company, London (GB)

( * ) Notice: Subject to any disclaimer, the term of this patent is extended or adjusted under 35 U.S.C. 154(b) by 204 days.

(21) Appl. No.: 12/441,022

(22) PCT Filed: Sep. 11, 2007

(86) PCT No.: PCT/GB2007/003437
§ 371 (c)(1),
(2), (4) Date: Mar. 12, 2009

(87) PCT Pub. No.: WO2008/032051
PCT Pub. Date: Mar. 20, 2008

(65) Prior Publication Data
US 2010/0034107 A1    Feb. 11, 2010

(30) Foreign Application Priority Data

Sep. 15, 2006  (MY) ............................. PI 20064158
Jan. 17, 2007  (EP) ................................. 07250178

(51) Int. Cl.
*H04W 4/00* (2009.01)

(52) U.S. Cl. ........ 370/329; 370/310; 370/328; 370/431; 455/114.2; 455/278.1; 455/296; 455/450; 455/509

(58) Field of Classification Search .......... 370/310–351, 370/431–464; 455/73, 78, 114.2, 278.1, 455/296, 450, 509
See application file for complete search history.

(56) References Cited

U.S. PATENT DOCUMENTS 4,736,453 A    4/1988    Schloemer
6,028,857 A *  2/2000    Poor ............................. 370/351

FOREIGN PATENT DOCUMENTS

EP    1 521 489    4/2005

OTHER PUBLICATIONS

Rashid-Farrokhi, F.; Tassiulas, L.; Liu, K.J.R.; , "Joint optimal power control and beamforming in wireless networks using antenna arrays," Communications, IEEE Transactions on , vol. 46, No. 10, pp. 1313-1324, Oct. 1998.*

(Continued)

*Primary Examiner* — Hassan Kizou
*Assistant Examiner* — Ashil Farahmand
(74) *Attorney, Agent, or Firm* — Nixon & Vanderhye P.C.

(57) ABSTRACT

A method allocates transmission channels to transmit nodes in a wireless network, the network comprising receive nodes and respective transmit nodes. Each receive node receives a data signal from its respective transmit node and is subject to interference from other transmission from other transmit nodes. The method includes: (i) determining the communication link gain of a data signal transmitted via each of communication paths; (ii) for each of the receive nodes, forming a set of the transmit nodes from which the receive node can tolerate interfering transmissions, (iii) collecting the formed set of transmit nodes from step (ii) for each receive node, and using the formed sets to generate a preferred set of transmit node and receive node pairs; and (iv) allocating a communication channel to the transmit nodes contained in the preferred set.

10 Claims, 5 Drawing Sheets

OTHER PUBLICATIONS

International Search Report for PCT/GB2007/003437, mailed Oct. 16, 2007.

Olafsson S. "Sufficient Conditions for Convergent Power Dynamics in Ad Hoc Networks", VTC 2006—Spring. 2006, IEEE 63$^{rd}$ Vehicular Technology Conference (IEEE CAT. No. 06CH37718) IEEE Piscataway, NJ, USA, pp. 2573-2577, XP002436848.

Nicholas Bambos et al., "Channel Access Algorithms With Active Link Protection for Wireless Communication Networks With Power Control", IEEE/ACM Transactions on Networking, vol. 8, No. 5, Oct. 2000, XP011038880.

* cited by examiner

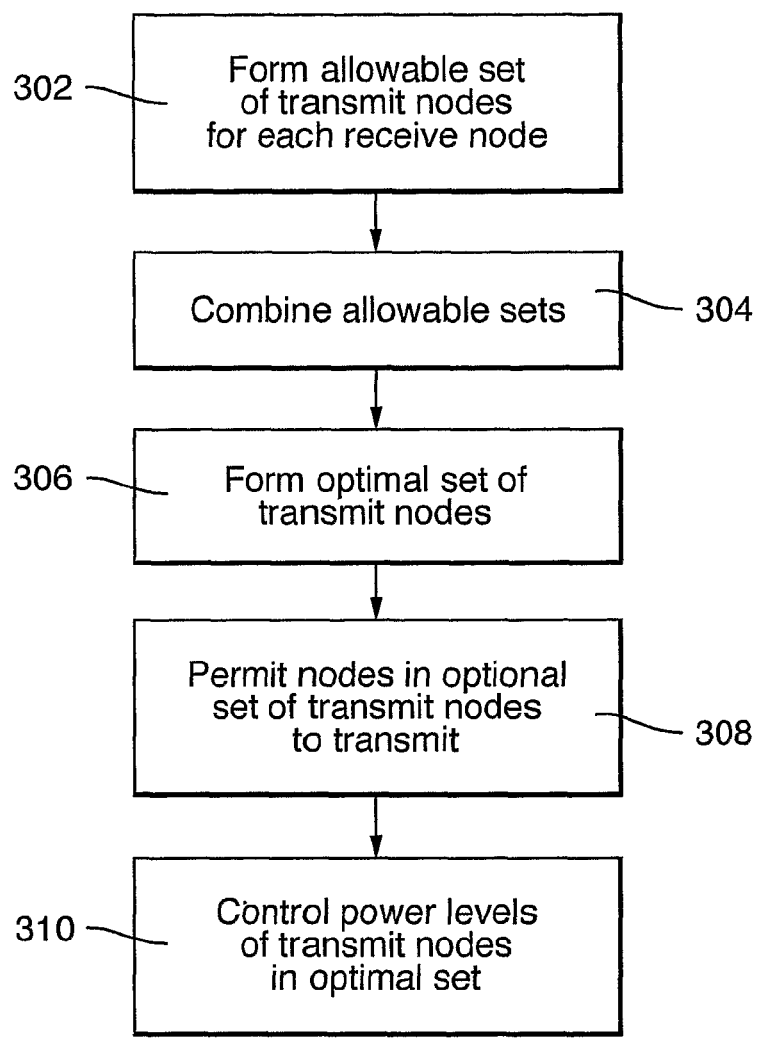
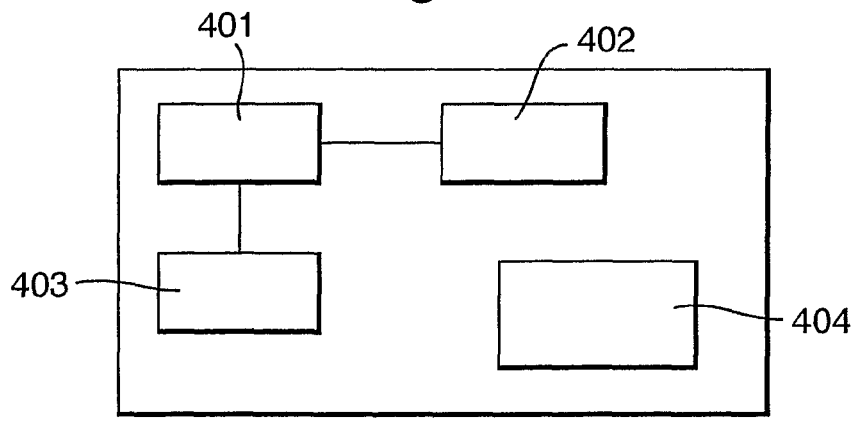

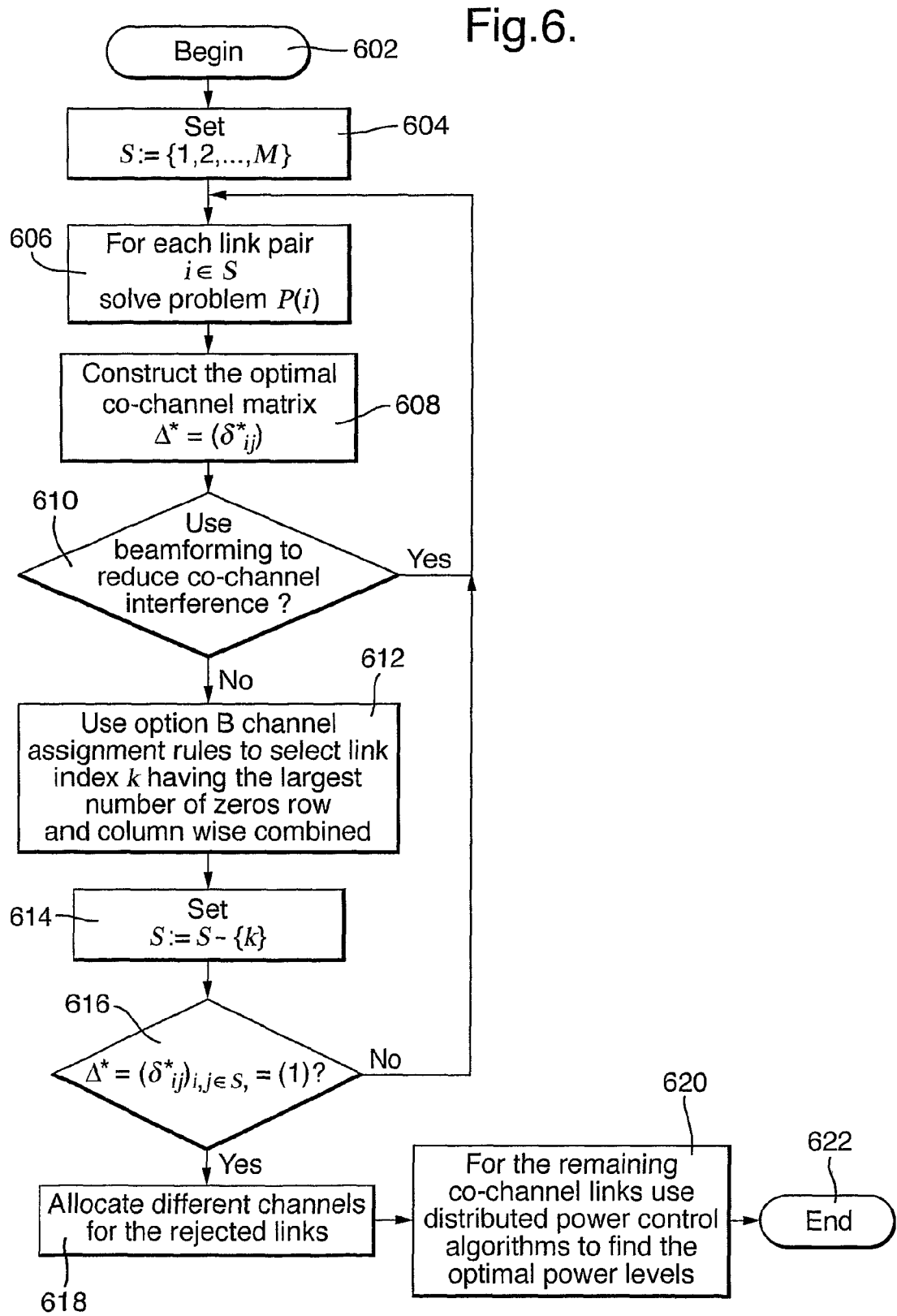

OPTIMISING COMMUNICATION LINKS

This application is the U.S. national phase of International Application No. PCT/GB2007/003437 filed 11 Sep. 2007 which designated the U.S. and claims priority to Malaysian Application No. PI 20064158, filed, 15 Sep. 2006 and European Application No. 07250178.6, Filed 17 Jan. 2007, the entire contents of each of which are hereby incorporated by reference.

BACKGROUND

1. Technical Field

The invention relates to a method for allocating transmission conditions to transmit nodes in a wireless network. In particular, the invention relates to allocating transmission conditions in a network having a receive node and a plurality of transmit nodes, in which the receive node is subject to interference from at least some of the transmit nodes when they transmit data signals over the network.

2. Description of Related Art

A general definition of an ad hoc network is a collection of mobile nodes, which communicate with each other over a wireless channel. By definition, ad hoc networks have no fixed infrastructure. All network functions have to be coordinated in a distributed manner between the network nodes. Central to the idea of ad hoc networks is the concept of multi-hop, where each node can act as a router and forward packets on behalf of other nodes towards their destination. This is in radical contrast to conventional cellular systems where each mobile device communicates directly to a base station, which controls all transmission and routing functions. An essential feature of ad-hoc networks, which has no parallel in wired networks, is the relationship between power control, call admission control, network topology and routing algorithms.

There are a number of parameters that can be used to control (and improve) the performance of the physical layer of ad hoc wireless networks. For example, modulation, transmit power, spreading code and antenna beams. By controlling these transceiver parameters adaptively and in an intelligent manner, the capacity of the system can be increased significantly. In earlier research works, power control, antenna beamforming and channel assignment or channel allocation were either done separately or in a combination of some of the above-mentioned techniques. Here we consider three synergistic parameters—transmit power, antenna beamforming and channel assignment as they are intuitively the easiest to exploit and perhaps the most studied. The benefits of antenna beamforming include reduced interference due to narrower beamwidth, longer range due to higher signal to noise and interference (SINR) ratio, and improved resistance to jamming. The benefits of power control include reduced interference and lower energy consumption. Channel assignment is mostly involved in frequency planning, channel reuse schemes and network capacity optimisation to limit network interference while maximizing the system capacity. Future techniques in interference mitigation in wireless networks may combine power control, antenna beamforming and channel assignment techniques to enable higher capacity due to increased spatial reuse, channel reuse, lower latency, better connectivity, longer battery lifetime, and better security (robustness to eavesdropping).

In the paper "Performance evaluation of distributed measurement-based dynamic channel assignment in local wireless communications" by M. M.-L. Cheng and J. C.-L. Chuang, IEEE Journal on Selected Areas in Communications, Vol 14, No. 4, pp. 698-710, May 1996, a method of channel allocation in wireless networks is proposed based on the least interference criterion. The idea behind this technique is that selecting the channel with the least interference requires the least transmission power to maintain the SINR threshold. Later Kulkarni and Srivastava (2002) addressed the problem of spatially reused frequency channels in FDMA based ad hoc networks by using adaptive modulation techniques described in "Channel Allocation for OFDMA based Wireless Ad-hoc Networks" by G. Kulkarni, V. Raghunathan, and M. B. Srivastava, SPIE International Conference on Advanced Signal Processing Algorithms, Architectures, and Implementations, Seattle, Wash., July 2002. Power control is then used to maintain the minimum QoS requirement caused by frequency reuse. The main objective of their study is to find an assignment of frequencies (channels) and transmission power levels such that the SINR threshold can be attained for all transmitter and receiver nodes. The authors' channel assignment algorithm is based on rate requirements for each pair of links. The links are first sorted in descending order according to their rate requirements. As such this algorithm is also known as minimum incremental power algorithm. At each step, a link which is not assigned a channel is chosen with the highest rate requirement. It is hoped that by assigning a channel to the link there is a least increase in the total transmission power over the entire network. If the assigned channel is not used by any other link, the increase in the total transmitted power is simply the power that is transmitted by the new link. Otherwise the transmitted power needs to be increased due to additional interference.

Another approach to mitigate co-channel interference effects and increase the network capacity is to avoid strong interferers by dynamically assigning the channels to the users as described by D. J. Goodman, S. A. Grandhi and R. Vijayan, "Distributed dynamic channel assignment schemes", Proc. IEEE Vehnicular Technology Conference, pp. 532-535, 1993. Of late there has been much research on integrating distributed dynamic channel and power allocation (DCPA) schemes. However the DCPA schemes do not integrate power control and channel assignment as one entity but rather are done separately. In the paper by A. H. M. Rad and V. W. S. Wong titled "Joint optimal channel assignment and congestion control for multi-channel wireless mesh networks", Proc. of IEEE International Conference on Communications (ICC'06), Istanbul, Turkey, June 2006, a joint optimal channel assignment and congestion control (JOCAC) method is proposed using a decentralized utility maximization problem with constraints arising from interference of neighbouring transmissions. To make efficient use of the available wireless resources their work considers both the non-overlapping and partial-overlapping channels in the algorithms. However this work does not consider the stability conditions that influences the channel selection for each link in depth.

Therefore there is a need for an improved method of optimising the number of transmit or sender nodes that can be permitted to transmit data signals in a wireless network.

BRIEF SUMMARY

According to a first embodiment of the invention, there is provided a method for allocating transmission channels to transmit nodes in a wireless network, the network comprising a plurality of receive nodes and a plurality of transmit nodes wherein each receive node is arranged in a transmitter-receiver pair with a respective transmit node, and each of the receive nodes is arranged to receive data signal transmitted from its respective transmit node of the transmitter-receiver pair via a first communication path and is subject to interference when other transmit nodes transmit data signals to their respective receive nodes via other communication paths, the method comprising:

(i) determining the communication link gain of a data signal transmitted via each of the communication paths;

(ii) for each of the receive nodes, forming a set of the transmit nodes from which the receive node can tolerate interfering transmissions by determining the maximum number of said others of the transmit nodes for which the sum of the interfering communication link gains of the other communication paths connecting those transmit nodes to the receive node does not exceed the quotient of the communication link gain of the first communication path divided by a predetermined quality of service threshold for the first communication path;

(iii) collecting the formed set of transmit nodes from step (ii) for each receive node, and using the formed sets to generate a preferred set of transmit node and receive node pairs such that the receive node of each transmit node and receive node pair in the preferred set can tolerate interfering transmissions from the transmit nodes of every other transmit node and receive node pair in the preferred set and (iv) allocating a communication channel to the transmit nodes contained in said preferred set.

Preferably, the method further comprises permitting a transmit node in the preferred set to transmit data signals over said communication channel.

The step of generating the preferred set may further comprises maximising the number of transmit nodes permitted to transmit data signals over said communication channel. Furthermore, the method may comprise permitting a transmit node not in the preferred set to transmit data signals over a different communication channel from said communication channel.

The method may comprise transmitting the preferred set to each of the plurality of transmit nodes. And the method may also comprise transmitting the preferred set to each of the plurality of receive nodes.

Preferably, the method comprises forming the preferred set by:

identifying that at least one of the receive nodes cannot tolerate interfering transmissions from at least one of the transmit nodes;

summing for each transmit node and receive node pair the number of transmit nodes from which the receive node of that pair cannot tolerate interfering transmissions with the number of receive nodes that cannot tolerate interfering transmissions from the transmit node of that pair;

forming a permissible set of transmit node and receive node pairs containing every transmit node and receive node pair except the transmit node and receive node pair for which the result of the summation is highest;

determining whether each receive node contained in the permissible set can tolerate interfering transmissions from all of the transmit nodes contained in the permissible set; and, if so:

taking the permissible set as the preferred set.

Preferably, if the permissible set contains a receive node that cannot tolerate interfering transmissions from at least one of the transmit nodes in the permissible set, the method further comprises performing one or more iterations, each iteration comprising the steps of summing, forming and determining until a permissible set is formed in which each receive node in the set can tolerate interfering transmissions from all of the transmit nodes in the set, wherein for each iteration subsequent to the first iteration the step of summing is performed using the transmit node and receive node pair contained in the permissible set formed during the previous iteration.

If the permissible set contains a receive node that cannot tolerate interfering transmissions from at least one of the transmit nodes in the permissible set, then the method further comprises:

forming a revised set of transmit nodes for each receive node in the permissible set by determining, if each receive node is subject to interference from only the transmit nodes contained in the permissible set, the maximum number of those transmit nodes from which each receive node can tolerate interference;

determining, based on the revised sets of transmit nodes, whether each of receive node in the permissible set can tolerate interfering transmissions from all of the transmit nodes contained in the permissible set; and if so, treating the permissible set as the preferred set of transmitter-receiver pairs.

Preferably, if the permissible set contains a receive node that cannot tolerate interfering transmissions from at least one of the transmit nodes in the permissible set, the method comprises the steps of, in each iteration:

forming a revised set of transmit nodes for each receive node in the permissible set by determining, if each receive node is subject to interference from only the transmit nodes contained in the permissible set, the maximum number of those transmit nodes from which each receive node can tolerate interference;

determining, based on the revised sets of transmit nodes, whether each of receive node in the permissible set can tolerate interfering transmissions from all of the transmit nodes contained in the permissible set; and if so;

treating the permissible set as the preferred set;

and if not:

performing the step of summing during the subsequent iteration based on the revised set of transmit nodes for the receive node of each transmit node and receive node pair.

According to a second embodiment of the present invention, there is provided a control apparatus for operation in a wireless network comprising a plurality of receive nodes and a plurality of transmit nodes wherein each receive node is arranged in a transmitter-receiver pair with a respective transmit node, and each of the receive nodes is arranged to receive data signal transmitted from its respective transmit node of the transmitter-receiver pair via a first communication path and is subject to interference when other transmit nodes transmit data signals to their respective receive nodes via other communication paths, the control apparatus arranged to:

determine the communication link gain of a data signal transmitted via each of the communication paths;

for each of the receive nodes, forming a set of the transmit nodes from which the receive node can tolerate interfering transmissions by determining the maximum number of said others of the transmit nodes for which the sum of the interfering communication link gains of the other communication paths connecting those transmit nodes to the receive node does not exceed the quotient of the communication link gain of the first communication path divided by a predetermined quality of service threshold for the first communication path;

collecting the formed set of transmit nodes from step (ii) for each receive node, and using the formed sets to generate a preferred set of transmit node and receive node pairs such that the receive node of each transmit node and receive node pair in the preferred set can tolerate interfering transmissions from the transmit nodes of every other transmit node and receive node pair in the preferred set and allocating a communication channel to the transmit nodes contained in said preferred set.

BRIEF DESCRIPTION OF DRAWINGS

The invention will now be described by way of example, with reference to the accompanying drawings, in which:

FIG. 3 shows a method of determining an optimal set of transmit nodes in a network comprising multiple receive nodes;

FIG. 4 shows a node suitable for implementing embodiments of the invention;

FIG. 6 shows a flowchart of generating an optimal set of transmitter-receiver pairs according to option B.

DETAILED DESCRIPTION

Figure 1:
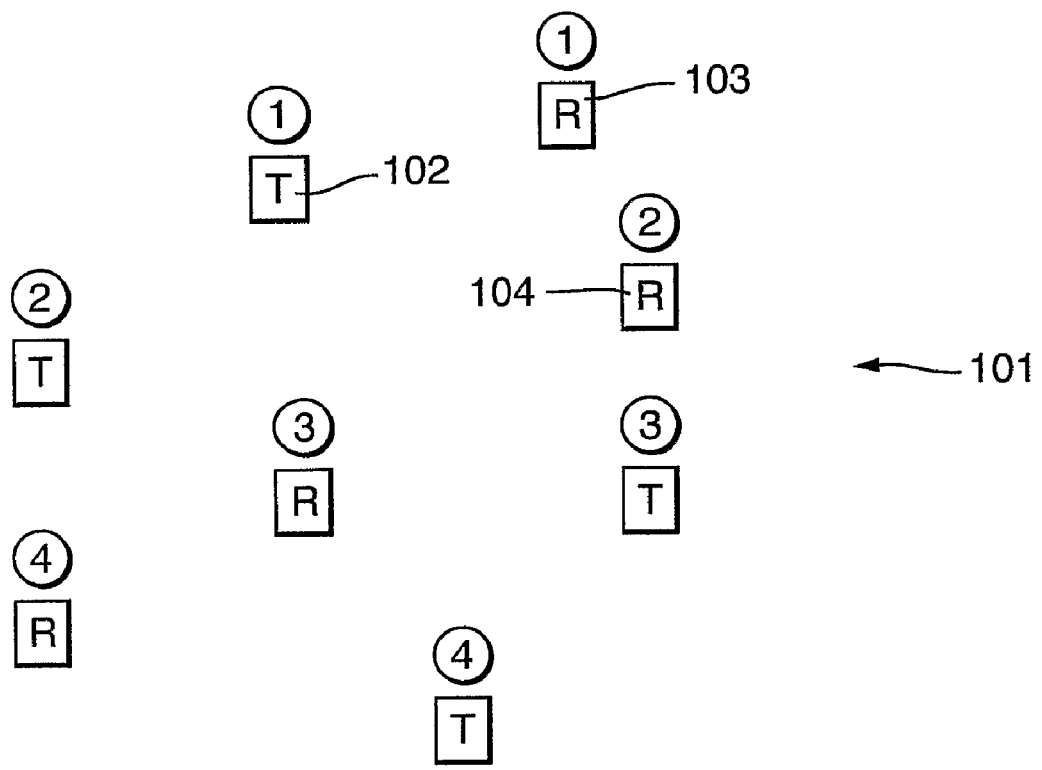
FIG. 1 shows a wireless network comprising receive nodes and transmit nodes arranged as transmitter-receiver pairs.

FIG. 1 shows four receive nodes and four transmit nodes in a wireless communication system, shown generally at 101. The nodes are arranged in transmitter-receiver pairs. For example, transmit node 102 and receive node 103 form the first transmitter-receiver pair. FIG. 1 illustrates four transmitter-receiver pairs. The transmitter-receiver pairs represent how the nodes are communicating at any particular instant in time. For example, at the time instant shown in FIG. 1 transmit node 102 is transmitting a data signal to receive node 103. The transmit nodes and receive nodes contained in the other transmitter-receiver pairs are similarly transmitting and receiving data signals respectively. The particular arrangement of transmitter-receiver pairs will typically change with time as some pairs of transmitter-receiver pairs finish communicating and new pairs of transmitter-receiver pairs form to start a new communications. Each node is typically capable of both transmitting and receiving data signals, so that the terms "receive node" and "transmit node" are used to designate a particular node's role at a particular time instant rather than to limit its capabilities. In particular, the roles of receive node and transmit node can change with time within a transmitter-receiver pair as each node in that pair takes its turn to transmit data signals to the other node.

Each of the receive nodes illustrated in FIG. 1 receives data signals not only from its designated transmit node but also from neighbouring transmit nodes. For example, the receive node of the second transmitter-receiver pair shown in FIG. 1 is likely to receive data signals not only from its respective transmit node, but also from transmit node 102, which is part of the first transmitter-receiver pair. This is because the data signals transmitted by transmit node 102 inherently incorporate some degree of "spread" so that, while the signals are directed towards receive node 103, some of part of the signal will be detectable at the location of receive node 104. The detection of these signals at receive node 104 represents the detection of unwanted signals, i.e. interference, which makes it more difficult for the receive node to correctly distinguish the data signals it wants to receive from its respective transmit node.

The interference suffered by the receive nodes from transmit nodes other than their respective transmit nodes can be explained by considering that each receive node is connected to every transmit node in the network by a respective communication path. A data signal transmitted by a transmit node is inevitably attenuated during its transmission. The attenuation is generally more pronounced the greater the distance between the transmit node and a receive node that is detecting the data signal. Some transmit nodes are also capable of controlling the direction of the transmitted signals, i.e. so that the data signals are preferentially transmitted towards the transmit node's respective receive node. Therefore, the attenuation suffered by a data signal transmitted via a particular communication path is also affected by the direction of that particular communication path (i.e. the bearing from the transmit node to that particular receive node). This effect can be represented by considering each communication path linking a receive node a transmit node as having an effective gain associated with it.

The receive nodes in a wireless network can therefore be considered as being connected to each of the transmit nodes in the network via a respective communication path. Each receive node receives wanted data signals from one of the transmit nodes via a communication path connecting the receive node to that transmit node. The receive node also receives unwanted data signals from the other transmit nodes (i.e. is subject to interference from those transmit nodes) via the other communication paths, which connect the receive node to those other transmit nodes. This situation is repeated for every receive node in the wireless network.

A receive node is typically able to tolerate a certain amount of interference from the transmit nodes in the network. The amount of interference that the receive node can tolerate depends on various factors, such as a minimum quality of service threshold that applies to the signals received from the receive node's respective transmit node, the effective gain of each of the communication paths connecting the receive node to the transmit nodes, the power with which the transmit nodes are transmitting and the sensitivity of the receive node's receiver.

There are various ways of mitigating the interference suffered by receive nodes in a wireless network. One way is by controlling the directionality of the signals transmitted by the transmit nodes. Another is by increasing the sensitivity of the receive node to signals received from a particular direction. Either or both of these can be achieved using beamforming.

Beamforming is a signal processing technique that takes advantage of interference to change the directionality of an antenna. Beamforming is typically implemented using an antenna array that actually consists of a plurality of individual antennas. The antenna array is generally a phased array.

When transmitting a signal, the array controls the amplitude and phase of the signal transmitted by each of the transmitting antennas to create a pattern of constructive and destructive interference in the wavefront. In other words, each antenna transmits the signal at a slightly different time so that each maximum of the signal reaches the receiver at the same time. The time delays between each transmission are determined based on the distance between each of the transmitting antennas and the receiver.

When receiving a signal, the array combines delayed signals received by each of the individual receiving antennas in the array at slightly different times. The delay applied to each of the received signals is dependent on the distances between each of the receiving antennas in the array and the transmitter. This combination of delayed signals effectively amplifies the received signal. A further option is to amplify the signals received at each antenna by a different weighting factor. If one of the weighting factors is made negative, it is possible to remove interference by combining an interfering signal received by one of the antennas with a negatively weighted version of that interfering signal received by one of the other antennas. Thus it is possible to ignore interfering signals received from one direction while listening to wanted signals received from a different direction.

Beamforming can therefore be used to change the effective gain of a communication path between a receive node and a transmit node. It can be seen that for a receive node and the transmit nodes from which it receives data signals (whether interfering or otherwise) changing the effective gain of any of the communication paths connecting that receive node to the transmit nodes can improve the interference situation for that receive node. For example, if either the receive node or its respective transmit node are capable of beamforming, the wanted data signals received by the receive node can be effectively amplified. If any of the interfering transmit nodes are capable of beamforming, then the interference to which the receive node is subjected can be reduced by increasing the directionality of the transmitted signals. Similarly, if the receive node is capable of beamforming, the directionality of the received signals can be improved by cancelling interfering signals.

The number of transmit nodes from which a receive node can tolerate interfering transmissions can therefore be increased by using beamforming to transmit and/or receive data signals. This is because beamforming can reduce the amount of interference to which a receive node is subjected and/or decrease the receive node's sensitivity to the amount of interference it is subjected to. However, it is not always desirable to implement beamforming as it increases the complexity of the transmit/receive process. It is therefore preferable to implement beamforming only if required. This can be advantageously be achieved by first determining the transmit nodes in a network from which a receive node can tolerate interfering transmissions and then, if not all of the transmit nodes can be tolerated by that receive node, determining whether beamforming increases the number of transmit nodes that the receive node is able to tolerate.

As explained above, there are many different methods for determining from which transmit nodes a receive node can tolerate interfering transmissions. These methods can include consideration of e.g. transmitter power levels, minimum signal to noise and interference (SNIR) ratios, rate requirements etc. One particular method is described in more detail below. It should be noted that the method of maximising the number of transmit nodes that can be accommodated in a network described herein is not limited to any specific method of determining from which transmit nodes a receive node can tolerate interfering transmissions. Any suitable method may be used.

Figure 2:
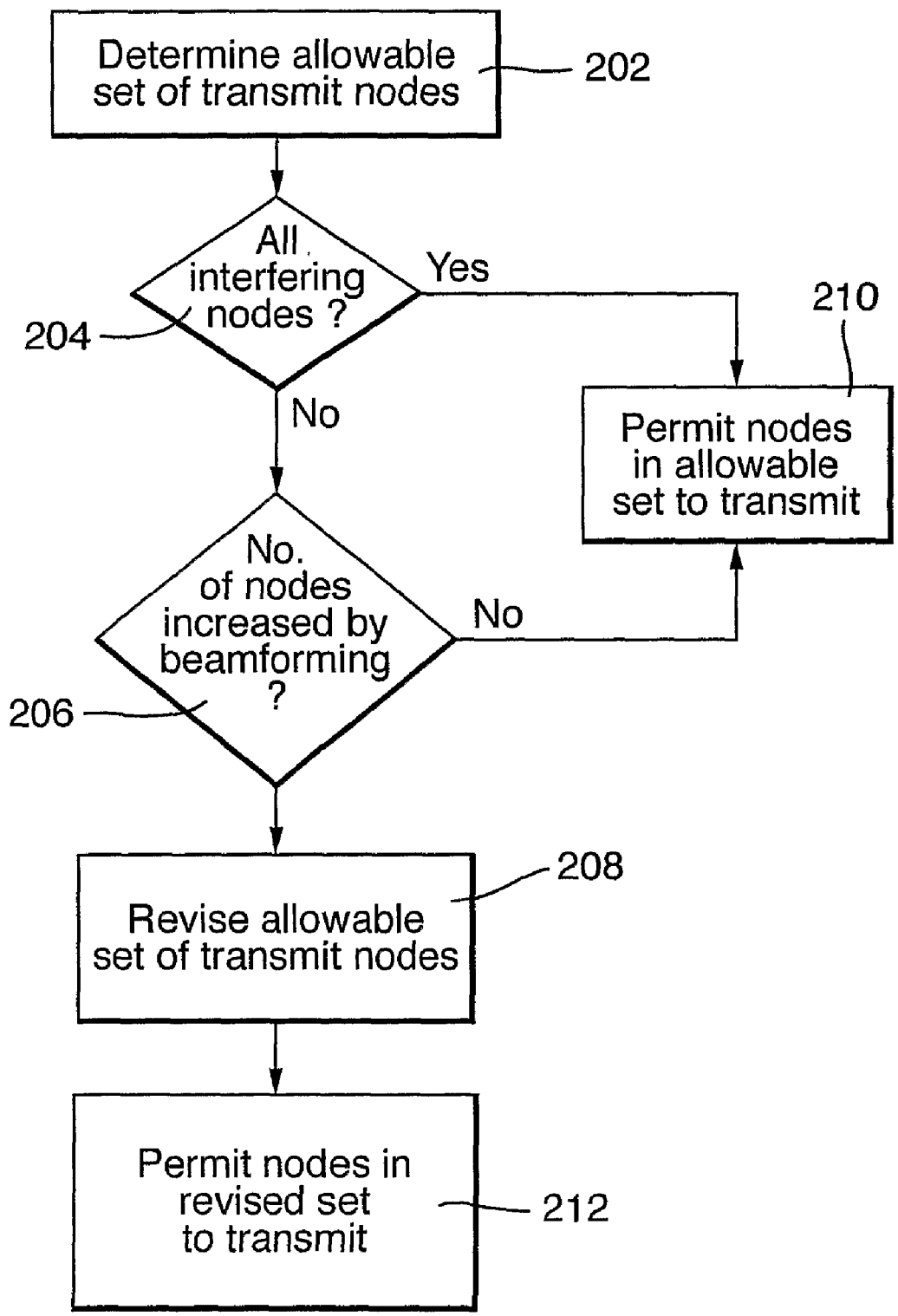
FIG. 2 shows a method of optimising the number of transmit nodes that can be tolerated by a receive node by using beamforming.

FIG. 2 illustrates the method of maximising the number of transmit nodes permitted to transmit data signals in a network described herein. In step 202, a set of transmit nodes from which a receive node can tolerate interference is determined. This step of determining is performed using the network conditions existing when beamforming is not performed. In step 204 it is determined whether all of the "interfering" transmit nodes in the network are contained in this set. If so, all of the transmit nodes contained in that set may be permitted to transmit data signals in the network (step 210). If not, it is determined in step 206 whether performing beamforming would change the network conditions sufficiently for the receive node to be able to tolerate interfering transmissions from more of the transmit nodes than were contained in the original set determined in step 202. If not, then only the transmit nodes contained in the previously formed set from step 202 may be permitted to transmit data over the network. If more transmit nodes can be accommodated using beamforming, however, then the set of allowable transmit nodes is revised (208) so that the transmit nodes that can be tolerated when beamforming is used can be permitted to transmit data signals in the network (step 212).

The steps shown in FIG. 2 can be performed for an individual receive node. However, it is probable that the network will contain multiple receive nodes, each with their own individual requirements and interference tolerances. Therefore, in a network having multiple receive nodes, the steps shown in FIG. 2 are preferably performed for each receive node so that a complete picture is formed of which receive nodes can tolerate interference from which of the transmit nodes. From this set of information, it is then possible to determine which of the transmit nodes can be permitted to transmit over the network. This process is shown in FIG. 3.

In step 302 a set of transmit nodes from which a receive node can tolerate interference is formed for each receive node in the network. These individual sets of transmit nodes are combined together in step 304. One suitable way of doing this is to form an optimal co-channel matrix (which is described in more detail below). Once the information for each individual receive node has been combined, an optimal set of transmit nodes is formed in step 306. The optimal set is preferably formed to maximise the number of transmit nodes and receive nodes whose communication needs can be satisfied. One way of doing this is to maximise the number of transmitter-receiver pairs that are permitted to operate in the network. The nodes contained in the optimal set of transmit nodes are then permitted to transmit data signals in step 308.

The step of forming the optimal set of transmit nodes shown in FIG. 3 may advantageously include the step of determining whether the number of tolerated nodes may be increased by using beamforming shown in FIG. 2. Rather than performing the "beamforming optimisation" when determining the optimal set of transmit nodes for each receive node, it may be preferable to perform it while forming the optimal set of transmit nodes for all the receive nodes.

A further step for optimising the number of transmit nodes permitted to transmit data signals in the network is shown in step 310. Step 310 consists of controlling the power used by each of the transmit nodes when transmitting data signals in the network. Controlling the transmit power enables both energy consumption and interference levels to be reduced. In ad-hoc networks, power control may be achieved using distributed power control. Power control is equally advantageous in the method shown in FIG. 2, in which a set of transmit nodes is determined for just one receive node.

The methods shown in FIGS. 2 and 3 may be performed by the network as a whole or by an individual node. For example, the step of forming the set of allowable transmit nodes for a particular receive node can be advantageously performed by that receive node. If the receive node is contained in a network comprising multiple receive nodes, it may determine an allowable set of transmit nodes for all of the receive nodes in the network and combine those sets to form an optimal set of transmitter-receiver pairs. Alternatively, the receive node may transmit its own allowable set to a different receive node so that the other receive node can combine the allowable sets of transmit nodes from all the receive nodes in the network. Each of these steps could also be performed by one of the transmit nodes.

This method is particularly applicable to ad-hoc networks. However, it may also be advantageously implemented in networks having a central controller, in which case it may be the central controller that forms the allowable set of transmit nodes for each receive node and/or combines the allowable sets for all of the receive nodes to form an optimal set of transmitter-receiver pairs. Such a central controller may also perform the step of power control shown in FIG. 3. The central controller could be e.g. a base station or one of the nodes. In ad-hoc networks, the step of power control is preferably implemented using distributed power control.

A node suitable for implementing embodiments of the invention is shown in FIG. 4. The node comprises an antenna 401, which is capable of both transmitting and receiving data signals. The antenna may be an antenna array that comprises multiple individual antennas arranged as a phased-array. The node comprises a receive unit 402 and a transmit unit 403. These units are preferably arranged to perform any modulation/demodulation, encryption/decryption, error detection and correction that may be required. The node also includes an optimisation unit 404 that is arranged to perform the method described herein in terms of forming sets of allowable transmit nodes, combining those allowable sets etc. The optimisation unit may be e.g. a digital processor arranged to execute software to perform the optimisation process.

A specific example of an optimisation algorithm for determining an allowable set of transmit nodes for a receive node will now be described.

The algorithm is described with respect to a network in which the nodes are arranged to transmit data signals over a communication channel. The network has multiple channels available to it over which data can be transmitted. Receive nodes are generally subject to interference from transmit nodes that transmit data signals over the same data channel as their respective transmit nodes. However, the receive nodes may also be subject to interference from data signals transmitted over overlapping channels or different channels. In the description below, it is assumed that receive nodes are only subject to interference from transmit nodes that transmit over the same channel as their respective transmit node. It should be noted that in the present description, references to transmit node and sender or sending node are used interchangeably.

We consider an ad hoc network system with M active pairs of co-channel communications, the so called active links where M>1. Each communication link consists of a receiver node and a sender node and without loss of generality there exists a subset of sender nodes $S=\{s_1, s_2, \ldots, s_M\}$ transmitting packets of data to another subset of receiving nodes $R=\{r_1, r_2, \ldots, r_M\}$. The transmission $t_i:s_i \rightarrow r_i$, $i=1, 2, \ldots, M$ is from a sender node to a receiver node, or to a relay node in multi-hop case. In this study, we focus on the downlink case, where a sender node $s_i$ transmits to the receiver node $r_i$.

The objective of power control in such a dynamic environment is to ensure that all communication pairs achieve an SINR above a required threshold. The implementation of power control could be in either of the following two forms: centralised or distributed. To begin with we denote $G_{r_i s_i}$ as the gain of the communication link between the $r_i$th receiver node and the $s_i$th sender node $$G_{r_i s_i} = \frac{S_{r_i s_i}}{d_{r_i s_i}^v}$$

where $S_{r_i s_i}$ is the attenuation factor, $d_{r_i s_i}$ denotes the distance between communicative pairs, and the subscripts $r_i$ and $s_i$ denote the receiver and sender nodes respectively. The parameter v is a constant that models the propagation path loss. We assume that $S_{r_i s_i}$, $1 \leq i \leq M$, are independent, log normal, identically distributed, random variables with 0 dB expectation and $\sigma^2$ log variance. The value of $\sigma$ in the range of 4-10 dB and the propagation constant v in the range of 3-5 usually provide good models for urban propagation non-line-of-sight. In general, given that there are M pair-wise interfering nodes in the system, we can denote the SINR of the $r_i$th receiver node by $$\gamma_{r_i} = \frac{G_{r_i s_i} P_{s_i}}{\sum_{j \neq i} G_{r_i s_j} P_{s_j} + \eta_{r_i}}, 1 \leq i, j \leq M \quad (1)$$

where $P_{s_i}$ is the transmit power of sender node $s_i$ and $\Theta_{r_i} > 0$ is the white noise of detected by node $r_i$. For each receiver node $r_i$ there is some SINR threshold requirement denoted by $\gamma_{r_i}^\infty > 0$, representing the receiver node $r_i$ minimal quality of service (QoS) it must support in order to operate successfully. Following the above arguments we then have $$\gamma_{r_i} \geq \gamma_{r_i}^\infty, 1 \leq i \leq M. \quad (2)$$

In matrix format, the relationship (1) and (2) can be expressed as $$(I-F)P \geq \Theta, P > 0 \quad (3)$$

where $$\Theta = \left[ \frac{\gamma_{r_1}^\infty \eta_{r_1}}{G_{r_1 s_1}}, \frac{\gamma_{r_2}^\infty \eta_{r_2}}{G_{r_2 s_2}}, \ldots, \frac{\gamma_{r_M}^\infty \eta_{r_M}}{G_{r_M s_M}} \right]^T,$$

$P=[P_{s_1}, P_{s_2}, \ldots, P_{s_M}]^T$ and $F=(F_{ij})$ is a matrix having the entries $F_{ij}=0$ for i=j and $$F_{ij} = \frac{\gamma_{r_i}^\infty G_{r_i s_j}}{G_{r_i s_i}}$$

for $i \neq j$, $1 \leq i,j \leq M$. Note that F has nonnegative elements and it can be shown that F is also irreducible, that is each row of F has no more than one zero element.

From the Perron-Frobenius theorem (described in more details by N. Bambos, S. C. Chen and G. J. Pottie in "Channel access algorithms with active link protection for wireless communications networks with power control", IEEE/ACM Transactions on Networking 8(5), pp. 583-597, 2000) we have the result given below.

Theorem 1
The following statements are equivalent:
1. There exists a power vector P>0 such that $(I-F)P \geq \Theta$.
2. The spectral radius of F, $\rho_F < 1$.
3. The matrix $(I-F)^{-1}$ exists and has positive entries.

Based on Theorem 1, we can deduce that if $\rho_F < 1$ then $(I-F)$ is non-singular with M independent rows and its inverse has positive entries. Because (I-F) is invertible hence there exists a unique solution $$P^* = (I-F)^{-1} \Theta > 0 \quad (4)$$

which lies at a vertex of all the linear constraints. From the discussions by S. Olafsson in "Sufficient conditions for convergent power dynamics in ad hoc networks", Proc. 63rd IEEE VTC Conference, Melbourne, May 2006 we have the following sufficient condition results for the links to have a feasible power vector.

Theorem 2 (Non-Singularity Condition)

If the matrix (I−F) is row diagonally dominant such that for all i=1, 2, ..., M $$\frac{G_{r_i s_i}}{\gamma_{r_i}^\infty} \geq \sum_{j \neq i} G_{r_i s_j} \quad (5)$$

then $(I-F)^{-1}$ exists and all the real parts of the eigenvalues of (I−F) are positive.

Theorem 3 (Stability Condition)

If (I−F) is row diagonally dominant for all i=1, 2, ..., M then the power constraints (I−F)P≧Θ, P>0 has a unique solution $P^* = (I-F)^{-1}\Theta > 0$.

Based on the concept of row diagonally dominant of the matrix (I−F), the inequality (5) reveals two important information on the stability of the power control constraints.

1. The lower the SINR threshold, $\gamma_{r_i}^\infty$ for the transmission between $s_i$ and $r_i$, the easier for them to achieve and maintain the stability condition.

2. By reducing the channel link gains from interfering senders $s_j$, j≠i the interference measured by the transmission pair $(r_i, s'_i)$ can then be reduced. The right-hand-side of (5) can be reduced by using smart or beamforming antennas and hence $(r_i, s_i)$ can achieve the stability condition and therefore increases the spatial and channel reuse within the system.

In our proposed method we wish to exploit the sufficient condition property for each transmission pairs in order to maximize the number of co-channel links the system is able to accommodate. In order to do so, we introduce a new variable $\delta_{r_i s_j}$, i,j=1, 2, ..., M $$\delta_{r_i s_j} = \begin{cases} 1 & \text{if receiver } r_i \text{ share the same channel as sender } s_j \\ 0 & \text{otherwise} \end{cases}$$

into our power control system. Hence we can write the SINR of the $r_i$ th receiver node by $$\gamma_{r_i} = \frac{G_{r_i s_i} P_{s_i}}{\sum_{j \neq i} \delta_{r_i s_j} G_{r_i s_j} P_{s_j} + \eta_{r_i}}, 1 \leq i, j \leq M \quad (6)$$

where $\delta_{r_i s_i} = 1$. Our main objective now is to find the optimal binary combinations of $\delta_{r_i s_j}$, i, j=1, 2, ..., M so that the following system $$(I-\hat{F})P \geq \Theta, P > 0 \quad (7)$$

has a feasible solution where $$\Theta = \left[\frac{\gamma_{r_1}^\infty \eta_{r_1}}{G_{r_1 s_1}}, \frac{\gamma_{r_2}^\infty \eta_{r_2}}{G_{r_2 s_2}}, \ldots, \frac{\gamma_{r_M}^\infty \eta_{r_M}}{G_{r_M s_M}}\right]^T,$$

and $\hat{F} = (\hat{F}_{ij})$ is a matrix having the entries $\hat{F}_{ij} = 0$ for i=j and $$\hat{F}_{ij} = \frac{\gamma_{r_i}^\infty \delta_{r_i s_j} G_{r_i s_j}}{G_{r_i s_i}}$$

for i≠j, 1≦i,j≦M.

To find the optimal combinations of $\delta_{r_i s_j}$, i,j=1, 2, ..., M we need to maximize the number of co-channel links the system is able to accommodate while minimizing the total interference each receiver node receives in order to maintain the minimum QoS requirement.

Before we begin to discuss the optimization model in a preferred embodiment of the present invention, we make the following assumptions.

Basic Assumptions

1. We assume the network structure is quasi-static and the time taken to assess the channel properties is less than the relative timescale of mobility of other co-channel links.

2. At an instantaneous time, each communication link consists of a sender node and a receiver node.

3. The nodes are self-organised and co-operative where local information is exchanged among network nodes.

Assumption 3 can be achieved via multiuser detection method, requiring all the sender nodes to send a constant power pilot tone. Such is the concept of self-organising networks where every node cooperates with each other to achieve a common goal of interference mitigation. As a result of Assumption 3, we can make the following supplementary assumptions Supplementary Assumptions 1. The number of co-channel links, M is known for any sender and receiver nodes in the system.

2. The link gains $G_{r_i s_i}$ and $G_{r_i s_j}$ between a receiver node $r_i$ and its sender node $s_i$, and other co-channel interfering nodes $s_j$, j=1, 2, ..., M, j≠i can be measured.

For each sender node i and receiver nodes i, in order to maximize the number of co-channel reusability we propose solving the following binary optimization problem $$P(i) \begin{bmatrix} \underset{\delta_{ij} \in \{0,1\}}{\text{maximise}} & \sum_{j \neq i} \delta_{ij} & (8) \\ \text{subject to} & \sum_{j \neq i} \delta_{ij} G_{ij} \leq \frac{G_{ii}}{\gamma_i^\infty} & (9) \\ \text{and} & \sum_{j \neq i} \delta_{ij} \leq M - 1 & (10) \end{bmatrix}$$

where $\delta_{ij} = \delta_{r_i s_j}$, $G_{ii} = G_{r_i s_i}$, $G_{ij} = G_{r_i s_j}$, $\delta_i^\infty = \gamma_{r_i}^\infty$ and $\alpha_{ij} \in (0,1)$, j≠i are pre-assigned parameters.

The main objective of the binary optimization (optimal $\delta^*_{ij}$, i≠j can only take either 0 or 1) is to maximize the number of co-channel links while satisfying two inequality constraints. Inequality (9) is known as the sufficient condition for sender node $s_i$ and receiver nodes $r_i$ to maintain stability of the power control dynamics where the sum of all the interfering link gains must be less than the link gain between $s_i$ and $r_i$ divided by the QoS requirement $\gamma_i^\infty$. For inequality (10), we require that the sum of all the co-channel interfering links must be less than M−1.

The above optimisation problem P(i) determines the maximum number of sender nodes $s_j$ from which a receive node $r_i$ can tolerate interfering transmissions. This is done by determining the maximum number of sender nodes $s_j$ (8) for which the sum of the interfering communication link gain of the communication paths connecting those transmit nodes to the receive node $r_i$ (the left-hand side of inequality (9)) does not exceed the quotient of the communication link gain of the communication path connecting receive node $r_i$ to its sender node $s_i$ divided by a predetermined quality of service threshold for that communication path (the right-hand side of inequality (9)).

Inequality (10) expresses that optimisation problem P(i) is required to form its optimal set of sender nodes from the sender nodes which may subject receive node $r_i$ to interference. These are the sender nodes of the other communication pairs in the network (i.e. all sender nodes other than sender node $s_i$). In a network system having M active pairs of cochannel links, the upper limit for the number of sender nodes that a receive node can tolerate is M−1 (inequality (10)).

By solving the above optimisation problem it is possible to determine a set of transmit nodes from which a receive node can tolerate interference. If the network comprises multiple receive nodes, $r_i$, then this optimisation is preferably performed for each receive node, $r_i$. The optimisation unit in each node may suitably be arranged to solve this optimisation problem.

The following example illustrates a receive node $r_1$ applying binary optimisation to determine the optimal $\delta^*_{ij}$, or more precisely, $\delta^*_{1j}$. Before any optimisation takes place, receive node $r_1$ effectively starts with the following:

$$\begin{array}{cccccc} & s_1 & s_2 & s_3 & s_4 & s_5 \\ \delta_{1j} = r_1[ & 1 & ? & ? & ? & ?] \end{array}$$

thus $r_1$ is at least able to tolerate transmissions from $s_1$.

The receive node $r_1$ then applies the above optimisation problem P(i) to determine which of the other sender nodes $s_2$, $s_3$, $s_4$, and $s_5$ it can also tolerate transmissions from. If we take the example that $r_1$ determines that it can tolerate transmissions from $s_3$, $s_4$, and $s_5$ after solving the binary optimisation problem P(i), then we end up with the following:

$$\begin{array}{cccccc} & s_1 & s_2 & s_3 & s_4 & s_5 \\ \delta^*_{1j} = r_1[ & 1 & 0 & 1 & 1 & 1] \end{array}$$

where $\delta^*_{1j}$ is the optimal co-channel matrix.

The calculations $r_1$ set out above are performed by each of the other receive nodes to determine $\delta^*_{ij}$. Once the optimal $\delta^*_{ij}$ is found for each receiver node $r_i$, i=1, 2, . . . , M, this information concerning the optimal of the values can be shared amongst all the nodes in the ad-hoc network in order to make further decisions. Thus, each pairwise nodes $s_i$, $r_i$ can set up an optimal co-channel matrix $\Delta^*$ defined as $$\Delta^* = (\delta^*_{ij})$$

where $\delta^*_{ii} = 1$, i=1, 2, . . . , M (link between $s_i$ and $r_i$ must always be active).

Thus, based on our example above, $\Delta^*$ might look like this (where the first row of the matrix is taken from $\delta^*_{1j}$):

$$\Delta^* = \begin{array}{c} \\ r_1 \\ r_2 \\ r_3 \\ r_4 \\ r_5 \end{array} \begin{array}{c} s_1\ s_2\ s_3\ s_4\ s_5 \\ \begin{bmatrix} 1 & 0 & 1 & 1 & 1 \\ 1 & 1 & 0 & 0 & 1 \\ 0 & 1 & 1 & 1 & 1 \\ 1 & 1 & 1 & 1 & 1 \\ 0 & 1 & 1 & 1 & 1 \end{bmatrix} \end{array}$$

Figure 5:
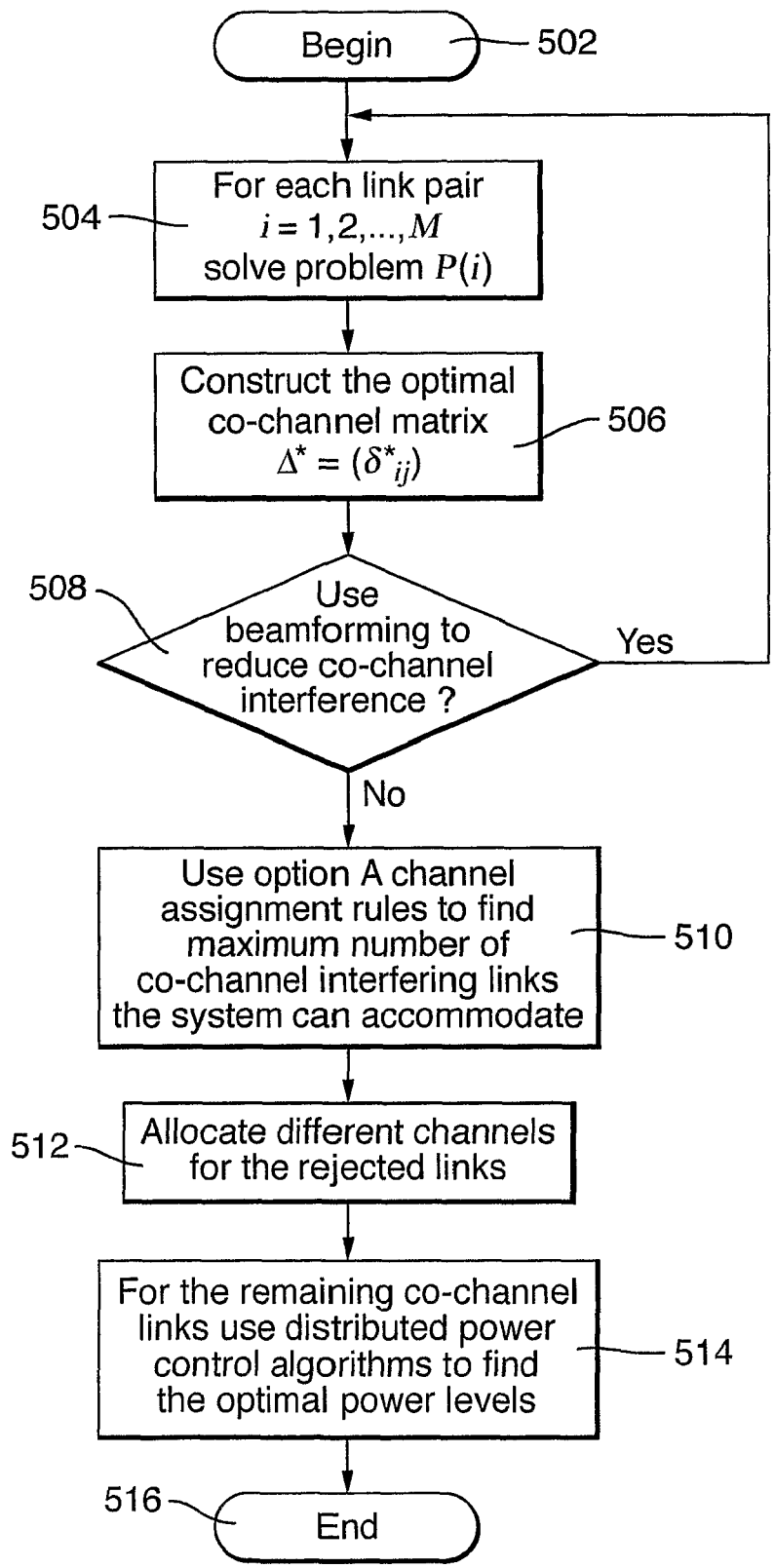
FIG. 5 shows a flowchart of generating an optimal set of transmitter-receiver pairs according to option A.

These steps are also shown in FIG. 5, steps 504 and 506 and described below.

In order to assign the most number of interfering nodes that can co-exists so that an optimal power vector can be found within its power limits, we have to find the optimal combination of sender and receiver nodes from the optimised co-channel matrix $\Delta^*$. Here we propose two algorithmic options, Option A and Option B, with their respective channel assignment rules.

Option A

Rule A1: Cover all zeros in the optimal co-channel matrix with as few horizontal and vertical lines as possible. For each selected horizontal line i (or vertical line i), cover the corresponding vertical line i (or horizontal line i) as well. Each horizontal line must pass through an entire row and each vertical line must pass through an entire column. The remaining elements in the matrix not covered by any lines will constitute the optimal combination of sender and receiver nodes the network can allowed.

Rule A2: If there is more than one optimal combination of sender and receiver nodes, the affected nodes can then adopt a co-operative behaviour as to which pair of nodes should be assigned a different channel in order to obtain better network performance for the remaining co-channel links.

The implementation of option A can be seen through the following example.

Assume we have 5 pairs of ad-hoc network nodes and the optimal co-channel matrix we obtain is $$\Delta^* = \begin{array}{c} \\ r_1 \\ r_2 \\ r_3 \\ r_4 \\ r_5 \end{array} \begin{array}{c} s_1\ s_2\ s_3\ s_4\ s_5 \\ \begin{bmatrix} 1 & 0 & 1 & 1 & 1 \\ 1 & 1 & 0 & 0 & 1 \\ 0 & 1 & 1 & 1 & 1 \\ 1 & 1 & 1 & 1 & 1 \\ 0 & 1 & 1 & 1 & 1 \end{bmatrix} \end{array}$$

To illustrate how the algorithm works, we can cover the zeros of the above matrix with a minimum number of 4 lines involving the transmission pairs ($r_1$, $s_1$) and ($r_2$, $s_2$). By so doing they either have to stop transmitting or they can select another channel to transmit their information so as not disturb the other existing links. As for the remaining sub-matrix involving transmission pairs ($r_3$, $s_3$) ($r_4$, $s_4$) and ($r_5$, $s_5$), they can safely use the same channel knowing full well once a distributed power control algorithm is invoked the respective power levels would converge to a finite level and the minimum QoS is attained.

$$\Delta^* = \begin{array}{c} \\ r_1 \\ r_2 \\ r_3 \\ r_4 \\ r_5 \end{array} \begin{array}{c} s_1\ s_2\ s_3\ s_4\ s_5 \\ \begin{bmatrix} 1 & 0 & 1 & 1 & 1 \\ 1 & 1 & 0 & 0 & 1 \\ 0 & 1 & 1 & 1 & 1 \\ 1 & 1 & 1 & 1 & 1 \\ 0 & 1 & 1 & 1 & 1 \end{bmatrix} \end{array}$$

A further example of algorithm A is shown below.

Assume again we have 5 pairs of ad-hoc network nodes and the optimal co-channel matrix $\Delta^*$ we obtain is $$\Delta^* = \begin{array}{c} \\ r_1 \\ r_2 \\ r_3 \\ r_4 \\ r_5 \end{array} \begin{array}{c} s_1\ s_2\ s_3\ s_4\ s_5 \\ \begin{bmatrix} 1 & 1 & 1 & 0 & 1 \\ 1 & 1 & 0 & 0 & 1 \\ 1 & 0 & 1 & 0 & 1 \\ 1 & 0 & 0 & 1 & 0 \\ 1 & 1 & 1 & 1 & 1 \end{bmatrix} \end{array}$$

Following rule 1, we have two types of channel assignment solutions:

$$\Delta^* = \begin{array}{c} \\ r_1 \\ r_2 \\ r_3 \\ r_4 \\ r_5 \end{array} \begin{array}{c} s_1\ s_2\ s_3\ s_4\ s_5 \\ \begin{bmatrix} 1 & 1 & 1 & 0 & 1 \\ 1 & 1 & 0 & 0 & 1 \\ 1 & 0 & 1 & 0 & 1 \\ 1 & 0 & 0 & 1 & 1 \\ 1 & 1 & 1 & 1 & 1 \end{bmatrix} \end{array}$$

and $$\Delta^* = \begin{array}{c} \\ r_1 \\ r_2 \\ r_3 \\ r_4 \\ r_5 \end{array} \begin{array}{c} s_1\ s_2\ s_3\ s_4\ s_5 \\ \begin{bmatrix} 1 & 1 & 1 & 0 & 1 \\ 1 & 1 & 0 & 0 & 1 \\ 1 & 0 & 1 & 0 & 1 \\ 1 & 0 & 0 & 1 & 1 \\ 1 & 1 & 1 & 1 & 1 \end{bmatrix} \end{array}$$

Hence the affected pairs $(r_3, s_3)$ and $(r_4, s_4)$ can co-operate via game theory approach as to which pair will exit from the system in order to maintain group equilibrium. We envisage that these self-organised networks can invoke MAC protocols to stimulate co-operation amongst themselves.

A flowchart to describing the whole channel assignment process for the option A scheme is shown in FIG. 5.

The algorithm begins at step 502. In step 504 the optimal $\delta^*_{ij}$ value for each receiver node $r_i$, i=1, 2, ..., M is found. This is achieved by finding the solution for each Problem P(i). The solution to each optimisation problem P(i) contributes a row of elements in the optimal co-channel matrix $\Delta^* = (\delta^*_{ij})$. The optimal co-channel matrix is formed in step 506. If the optimal co-channel matrix indicates that not all of the transmitter-receiver pairs can be accommodated (e.g. if the co-channel matrix contains one or more zeroes), then in step 508 it is determined whether or not beamforming could be used to reduce co-channel interference. If beamforming can reduce co-channel interference, the process returns to step 504 for a repeat of the optimisation process using the new parameters created by using beamforming. If not, the process continues by finding the maximum number of co-channel nodes the system can accommodate by using the proposed channel assignment rules (step 510). For those links which belong to a sub-matrix having all elements one they constitute the acceptable co-channel links that the system can accommodate. Those links that do not belong to that sub-matrix cannot be accommodated. The rejected links are allocated different channels in step 512. For example, the rejected links can choose the next available non-overlap or partial overlap channel to transmit. The links that can be accommodated over the communication channel can autonomously adjust their power levels according to some distributed power control algorithms (step 514).

Option B

Instead of creating one optimal co-channel matrix and deleting interfering links from the matrix using the least number of horizontal and vertical lines, here we propose deleting one interfering link one at a time while setting up a sequence of optimal co-channel matrices.

Rule B1: Select the link index, k having the largest number of zeros row and column wise combined. Cover all the zeros of the link index in the optimal co-channel matrix with horizontal and vertical lines. For the selected horizontal line $r_k$ (or vertical line $s_k$), cover the corresponding vertical line $s_k$ (or horizontal line $r_k$) as well. Each horizontal line must pass through an entire row and each vertical line must pass through an entire column. The remaining elements in the matrix not covered by any lines will constitute the next combination of sender and receiver nodes the network can be allowed.

Rule B2: If there is more than one pair of affected sender and receiver nodes, the nodes can adopt a co-operative behaviour as to which pair of nodes should be deleted from the system.

Rule B3: If there are no more rows and columns to cover then exit. Otherwise solve Problem P(i) for the remaining active link indices and return to Rule B1.

A flowchart to describing the whole channel assignment process for the option B scheme is shown in FIG. 6.

The algorithm begins in step 602. An initial set of links S:={1, 2, ..., M} is formed in step 604. From this set of links, the algorithm finds the optimal $\delta^*_{ij}$ values for each receiver node $r_i$, i=1, 2, ..., M (step 606). The solution for each Problem P(i) contributes a row of elements in the optimal co-channel matrix $\Delta^* = (\delta^*_{ij})$, which is constructed in step 608. The algorithm then considers whether or not beamforming can be used to reduce co-channel interference in step 610. Similarly to algorithm A, if beamforming can reduce co-channel interference the optimisation process is repeated. The next phase of the channel selection process begins in step 612 by identifying an interfering link to be exited from the system, and we do this by selecting the link having the largest number of zeros, row and column wise combined. Once we have deleted the affected link from the set S in step 614 we then assess whether the remaining co-channel sub-matrix is able to share the same channel or not (step 616). For those links which belong to the sub-matrix having all elements one, they will then constitute the acceptable co-channel links that the system can accommodate and the links can then autonomously adjust their power levels according to some distributed power control algorithms (step 620). Otherwise we proceed back to set up a sequence of binary optimization problem by returning to step 606 to find a new set of optimal co-channel matrix, with its row and column dimensions one less than the previous co-channel matrix, and subject it to the abovementioned channel assignment rules. Following Algorithm A, for those links which are rejected by the system, they can then choose the next available non-overlap or partial overlap channel to transmit (step 618).

The co-channel links that the system can be accommodated can be considered as an optimal set of transmitter-receiver pairs.

One aim of the optimisation method described above is to maximise the number of transmitter-receiver nodes able to operate within a network but without having to use beamforming unnecessarily. Therefore, if more than one of the nodes is capable of beamforming it may be implemented selectively so as to maximise the number of transmitter-receiver pairs while minimising the number of nodes required to use beamforming. For example, when it has been determined which of the transmitter-receiver pairs is most affected by interference, beamforming could then be selectively implemented to initially assist that transmitter-receiver pair. The most affected transmitter-receiver pair is determined by adding together, for each transmitter-receiver pair, the number of transmit nodes which the receive node cannot tolerate and the number of receive nodes which cannot tolerate the transmit node. The transmitter-receiver pair for which this sum is the highest number of nodes is the most affected transmitter-receiver pair. For example, if one of the most affected pair is capable of beamforming, then using that node to perform beamforming may allow more transmitter-receiver pairs to be introduced into the optimal set than using one of the other nodes to perform beamforming.

The channel allocation algorithms described above simply aim to maximise the number of transmitter-receiver pairs that can be permitted to transmit data signals over a channel. A further option is to introduce a concept of priority into the allocation process. So, for example, if one transmitter-receiver pair has a high priority, but it is the pair that is most affected by interference, it may nonetheless be permitted to transmit data because of its high priority status. The pair that is the next most affected by interference may be prevented from transmitting in preference to the high priority pair.

The nodes may be capable of transmitting data signals according to any suitable access scheme, such as TDMA, FDMA or CDMA.

The methods described herein have been described specifically with reference to ad-hoc networks. However, it should be understood that these methods are equally applicable to networks having a central controller.

In the above method of integrating power control, channel assignment and beamforming mechanism in ad hoc wireless networks, we make full use of the signal-to-interference plus noise ratio requirements for each pair wise links in order to find an optimal channel assignment for each pair of links. In short, the optimal channel assignment of each pair of links is directly linked to the power control constraints involved. Furthermore based on the assumption of self-organising and co-operative nature of ad hoc networks, we also harness beamforming mechanism in our algorithm via the stability and non-singularity conditions so that we can maximize channel reusability, and hence increase the number of links sharing the same channel in the network. In order to assign the most number of interfering nodes that can co-exist so that an optimal power vector can be found within its power limits, we have also proposed a novel way to find the optimal combination of co-channel links.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A method for allocating transmission channels to transmit nodes in a wireless network, the network comprising a plurality of receive nodes and a plurality of transmit nodes wherein each receive node is arranged in a transmitter-receiver pair with a respective transmit node, and each of the receive nodes is arranged to receive data signal transmitted from its respective transmit node of the transmitter-receiver pair via a first communication path and is subject to interference when other transmit nodes transmit data signals to their respective receive nodes via other communication paths, the method comprising:
   (i) determining the communication link gain of a data signal transmitted via each of the communication paths;
   (ii) for each of the receive nodes, forming a set of the transmit nodes from which the receive node can tolerate interfering transmissions by determining the maximum number of said others of the transmit nodes for which the sum of the interfering communication link gains of the other communication paths connecting those transmit nodes to the receive node does not exceed the quotient of the communication link gain of the first communication path divided by a predetermined quality of service threshold for the first communication path;
   (iii) collecting the formed set of transmit nodes from step (ii) for each receive node, and using the formed sets to generate a preferred set of transmit node and receive node pairs such that the receive node of each transmit node and receive node pair in the preferred set can tolerate interfering transmissions from the transmit nodes of every other transmit node and receive node pair in the preferred set and
   (iv) allocating a communication channel to the transmit nodes contained in said preferred set;
   the preferred set is generated by:
   identifying that at least one of the receive nodes cannot tolerate interfering transmissions from at least one of the transmit nodes;
   summing for each transmit node and receive node pair the number of transmit nodes from which the receive node of that pair cannot tolerate interfering transmissions with the number of receive nodes that cannot tolerate interfering transmissions from the transmit node of that pair;
   forming a permissible set of transmit node and receive node pairs containing every transmit node and receive node pair except the transmit node and receive node pair for which the result of the summation is highest;
   determining whether each receive node contained in the permissible set can tolerate interfering transmissions from all of the transmit nodes contained in the permissible set; and, if so:
   taking the permissible set as the preferred set.

2. A method as claimed in claim 1, comprising permitting a transmit node in the preferred set to transmit data signals over said communication channel.

3. A method as claimed in claim 1, wherein the step of generating the preferred set further comprises maximising the number of transmit nodes permitted to transmit data signals over said communication channel.

4. A method as claimed in claim 1, comprising permitting a transmit node not in the preferred set to transmit data signals over a different communication channel from said communication channel.

5. A method as claimed in claim 1 comprising transmitting the preferred set to each of the plurality of transmit nodes.

6. A method as claimed in claim 1, comprising transmitting the preferred set to each of the plurality of receive nodes.

7. A method as claimed in claim 1, wherein, if the permissible set contains a receive node that cannot tolerate interfering transmissions from at least one of the transmit nodes in the permissible set, the method comprises performing one or more iterations, each iteration comprising the steps of summing, forming and determining until a permissible set is formed in which each receive node in the set can tolerate interfering transmissions from all of the transmit nodes in the set, wherein for each iteration subsequent to the first iteration the step of summing is performed using the transmit node and receive node pair contained in the permissible set formed during the previous iteration.

8. A method as claimed in claim 7, wherein, if the permissible set contains a receive node that cannot tolerate interfering transmissions from at least one of the transmit nodes in the permissible set, the method comprises the steps of, in each iteration:

forming a revised set of transmit nodes for each receive node in the permissible set by determining, if each receive node is subject to interference from only the transmit nodes contained in the permissible set, the maximum number of those transmit nodes from which each receive node can tolerate interference;

determining, based on the revised sets of transmit nodes, whether each of receive node in the permissible set can tolerate interfering transmissions from all of the transmit nodes contained in the permissible set; and if so, treating the permissible set as the preferred set;

and if not:

performing the step of summing during the subsequent iteration based on the revised set of transmit nodes for the receive node of each transmit node and receive node pair.

9. A method as claimed in claim 1, wherein, if the permissible set contains a receive node that cannot tolerate interfering transmissions from at least one of the transmit nodes in the permissible set, the method comprises:

forming a revised set of transmit nodes for each receive node in the permissible set by determining, if each receive node is subject to interference from only the transmit nodes contained in the permissible set, the maximum number of those transmit nodes from which each receive node can tolerate interference;

determining, based on the revised sets of transmit nodes, whether each of receive node in the permissible set can tolerate interfering transmissions from all of the transmit nodes contained in the permissible set; and if so, treating the permissible set as the preferred set of transmitter-receiver pairs.

10. A control apparatus for operation in a wireless network comprising a plurality of receive nodes and a plurality of transmit nodes wherein each receive node is arranged in a transmitter-receiver pair with a respective transmit node, and each of the receive nodes is arranged to receive data signal transmitted from its respective transmit node of the transmitter-receiver pair via a first communication path and is subject to interference when other transmit nodes transmit data signals to their respective receive nodes via other communication paths, the control apparatus comprising:

means for determining the communication link gain of a data signal transmitted via each of the communication paths;

for each of the receive nodes, means for forming a set of the transmit nodes from which the receive node can tolerate interfering transmissions by determining the maximum number of said others of the transmit nodes for which the sum of the interfering communication link gains of the other communication paths connecting those transmit nodes to the receive node does not exceed the quotient of the communication link gain of the first communication path divided by a predetermined quality of service threshold for the first communication path;

means for collecting the formed set of transmit nodes for each receive node, and using the formed sets to generate a preferred set of transmit node and receive node pairs such that the receive node of each transmit node and receive node pair in the preferred set can tolerate interfering transmissions from the transmit nodes of every other transmit node and receive node pair in the preferred set and allocating a communication channel to the transmit nodes contained in said preferred set, the preferred set is generated by:

identifying that at least one of the receive nodes cannot tolerate interfering transmissions from at least one of the transmit nodes;

summing for each transmit node and receive node pair the number of transmit nodes from which the receive node of that pair cannot tolerate interfering transmissions with the number of receive nodes that cannot tolerate interfering transmissions from the transmit node of that pair;

forming a permissible set of transmit node and receive node pairs containing every transmit node and receive node pair except the transmit node and receive node pair for which the result of the summation is highest;

determining whether each receive node contained in the permissible set can tolerate interfering transmissions from all of the transmit nodes contained in the permissible set; and, if so:

taking the permissible set as the preferred set.

* * * * *